Jan. 16, 1940. B. W. FREEMAN Re. 21,321

METHOD OF AND APPARATUS FOR ORNAMENTING SHOE PARTS

Original Filed Aug. 27, 1930 3 Sheets-Sheet 1

Inventor
Benjamin W. Freeman,

By Riordan & Riordan
Attorney

Jan. 16, 1940. B. W. FREEMAN Re. 21,321

METHOD OF AND APPARATUS FOR ORNAMENTING SHOE PARTS

Original Filed Aug. 27, 1930 3 Sheets-Sheet 2

Inventor
Benjamin W. Freeman,

By Riordon & Riordon
Attorney

Jan. 16, 1940. B. W. FREEMAN Re. 21,321

METHOD OF AND APPARATUS FOR ORNAMENTING SHOE PARTS

Original Filed Aug. 27, 1930 3 Sheets-Sheet 3

Inventor

Benjamin W. Freeman

By Riordon & Riordon

Attorney

Reissued Jan. 16, 1940

Re. 21,321

UNITED STATES PATENT OFFICE 21,321

METHOD OF AND APPARATUS FOR ORNAMENTING SHOE PARTS

Benjamin W. Freeman, Cincinnati, Ohio

Original No. 1,990,592, dated February 12, 1935, Serial No. 478,264, August 27, 1930. Renewed February 21, 1934. Application for reissue April 7, 1938, Serial No. 200,765

89 Claims. (Cl. 101—316)

The present invention relates to a method of marking shoe parts at the same time, or as part of the cycle of operations, during which the shoe part is ornamented by perforating, cutting out, or the like.

Shoes designed particularly for women's wear are usually ornamented by the cutting out of open work patterns in the upper thereof, or by perforating designs therein. This ornamentation is effected either on a flat blank or on the upper, after it has been closed, but prior to the complete assembly of all parts of the shoe. When the ornamentation is accomplished in the blank it is generally done on a machine of the flat bed type on which the work is laid on a flat support, and when the upper is closed prior to the ornamentation, it is cut out generally on a universal type of cutout machine, which type may, however, operate on flat work as well as on closed uppers.

For various reasons, such as to facilitate subsequent operations and assembly of the ornamented blank or upper, it is necessary to place marks on the blank, such marks taking the form of guide lines for stitching or as an outline upon one blank to indicate the position in which another part is to be applied, or as a guide line for subsequent perforations. It may be found desirable to place further ornamentation such as a stamped design on the shoe part. As a matter of fact such stamped design may not only be an ink mark, but could be formed by the use of impression papers of various kinds, such as gold leaf, silver leaf, colored leaves, etc. The ink marking might be left on in some cases to imitate a stitch as distinguished from a guide line for subsequent stitching.

Where heretofore the application of this additional marking has required a separate handling of the work from the handling necessary to accomplish the perforating thereof, it is an object of the present invention to devise a method wherein the extra handling of the work is eliminated and additional time saved by performing the operation of marking simultaneously with the perforation of the work, or as a part of the cycle of operations necessary to perforate the shoe part. In marking work heretofore two general methods have been brought into play, first, an independent marking of the work with ink, and second, a marking by means of an impression, or partial cutting into the leather. This latter form of marking has been effected either separately from the main ornamentation of the shoe part, or as a part of the cycle of operation, but has been found to be unsatisfactory except when a flat bed type of machine is used. Even in a machine of this type, the results obtained are more or less unsatisfactory, for such a method of marking is limited to flat bed dies and cannot satisfactorily be accomplished with a universal machine, and furthermore, marking by indentation or partial cutting out is objectionable, for the reason that there are a great many different kinds of leather which cannot be marked satisfactorily by mere impression.

The combination cutout and marking dies having impression markers as used under present practice are limited to certain kinds of material. Thin hard surface leathers, such as kid as used in the manufacture of women's shoes, do not take an impression very readily, whereas comparatively heavy leathers, such as calf skin, which are used in the manufacture of men's shoes can be marked in this manner. As a consequence the use of combination cutout, perforating, marking and impression dies is limited to factories manufacturing, for the most part, men's and boy's medium and cheap shoes, where rather heavy calf skin is used. Patent leather also takes a rather good impression, but kid skins cannot be successfully marked, nor can any of the fancy embossed leathers, or such leathers as snake, alligator, etc., where the finish of the leather does not allow for an ordinary indented mark to be readily seen by the operator, particularly when the marked leather is in position to be stitched, or for an applique or other part to be aligned thereon, etc., and in such a position that unless the mark or indentation is of sufficient depth in the material as to make it readily recognizable.

Another objection to methods using impression marking, arises when varying thicknesses of leather are used. It is impractical to mark and cutout in this manner, as the resilient means for supporting the marking die does not lend itself for automatic adjustment to thicknesses that vary to any great extent. This resilient means is usually a conventional stripper plate mounting, there being also a rubber supporting member for the marking and stripping plate, effective to distribute pressure from the resilient mounting throughout the plate, and if the combination die with the resilient means is adjusted to mark and cutout properly on a light piece of calf skin, it would probably cutout a heavy piece also but the indented mark would be so deep as to mar or cut the material and vice versa. This is due to the fact that when working on thin leathers, when the cutting operation has been completed and the die has been forced through the material, the marking element must be exerted against the surface of the leather, with the proper amount of pressure to make an indentation. At this point, the relative position between the cutting edges of the die and the marking edges of the impression marker vary according to the thickness of the material. Where the material is thick, the marker is depressed more than on thin leather. If the impression marker is so resiliently mounted as to give the proper impression on a thin piece of leather, then with the same setting, a thick piece of leather will create too much pressure causing the leather to be cut, assuming that the thin and thick pieces of leather are of the same character. When different characters of leather are marked, even though they may be of the same thickness, it may be necessary to exert more pressure on one piece of material than on another piece.

Under such conditions, the reative position of the marking edges of the impression marker and the cutting edges of the die will be relatively the same on these two pieces, but the pressure exerted will be different if these two pieces of the same thickness require different amounts of pressure to produce the desired impression.

As a consequence of these requirements, it follows that the marking die must be either automatically adaptable to such varying conditions, or it must be changed to meet such conditions. It is impractical to use a die that requires changes under these varying conditions, and heretofore no one has produced a cutout and impression marker die that will meet these conditions.

It is for these reasons that recourse has been had to ink marking of leather, but as stated above, while ink marking methods and machines are well known per se, it has heretofore been found impractical to combine an ink marker with either the flat bed machine or the universal type of machine, thus necessitiating an additional handling of the work for the marking step.

Efforts have been made to combine ink marking and perforating in a rather crude manner, such as by inserting perforating tubes or simple cutting arrangements in an ordinary marking die. This type of device offers objections, in that no provision is made for stripping the work from the cutters, ink may get on the cutting elements and be subsequently transferred to the work adjacent or within the perforations, and there is a general tendency towards smearing the work; no means is provided for a relative movement between the marking and cutting elements such that the marker may be inked to the exclusion of the cutters, and no provision is made for handling varying thicknesses of work with a single unit.

By the method of this invention all of the objections and disadvantages of previous methods are eliminated, and it is possible to mark and perforate or cut-out any kind of material regardless of its finish or thickness, and regardless of whether or not it is flat or fitted work. The use of ink permits a very legible marking which is readily followed by an operator and at the same time does not prevent a good clean perforation, and requires no pressure for indenting the work, thus avoiding the objections to impression markers.

For purposes of illustration of one form of machine which lends itself readily to this method, reference may be made to the patent to Freeman No. 1,681,033, dater August 14, 1928, in which a universal type of cutout machine is described.

A preferred embodiment of a machine suitable for my purpose is illustrated in the accompanying drawings, of which:

It will be observed that in this machine as modified to carry out the present method, there is provided a frame 10 having a work support 12. This support will be preferably in the form of a horn or anvil so that either flat or fitted work may be placed thereon. The top surface of the support may be faced with a soft material such as brass, which will not be injurious to the cutting edges of the perforating die in case there is contact between the two. Across this surface a paper strip may be fed to function as backing material for the cutting edges of the die, thereby insuring a good clean cut, the paper being automatically fed after each cutting operation by a suitable mechanism indicated generally at 14.

In order to properly gauge and position the work for cutting out operations, a mask 16 may be utilized, this mask having a gauging edge adapted to coincide with some portion of the work and thus indicate to the operator when the work is properly positioned. As described in the Freeman patent above noted, this mask may be solid and have its outer edge adapted to function as a gauging edge or it may be cut out to permit passage of a die therethrough and an internal edge might be utilized as a gauge. In some forms of work, both the internal and outer edges may be used if found desirable.

Figure 1:
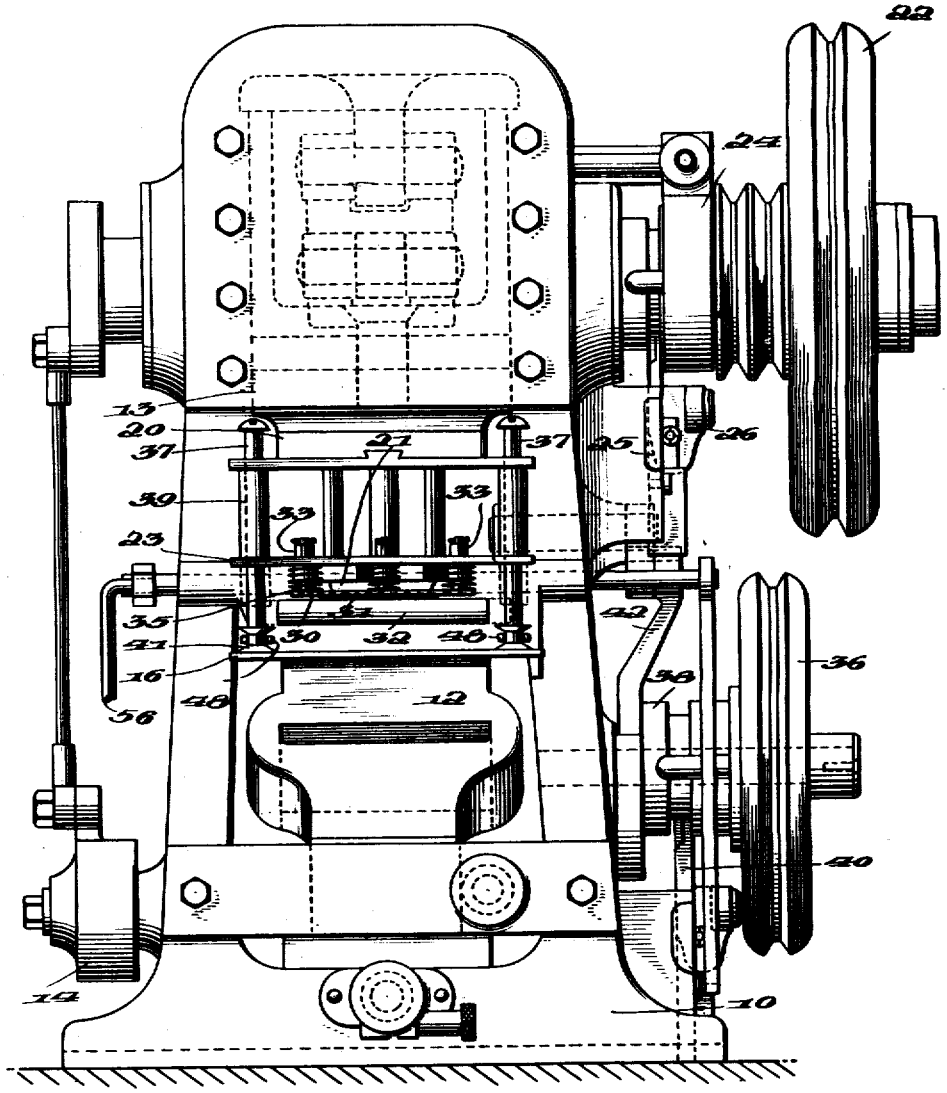
Fig. 1 represents a front elevation.
Figure 2:
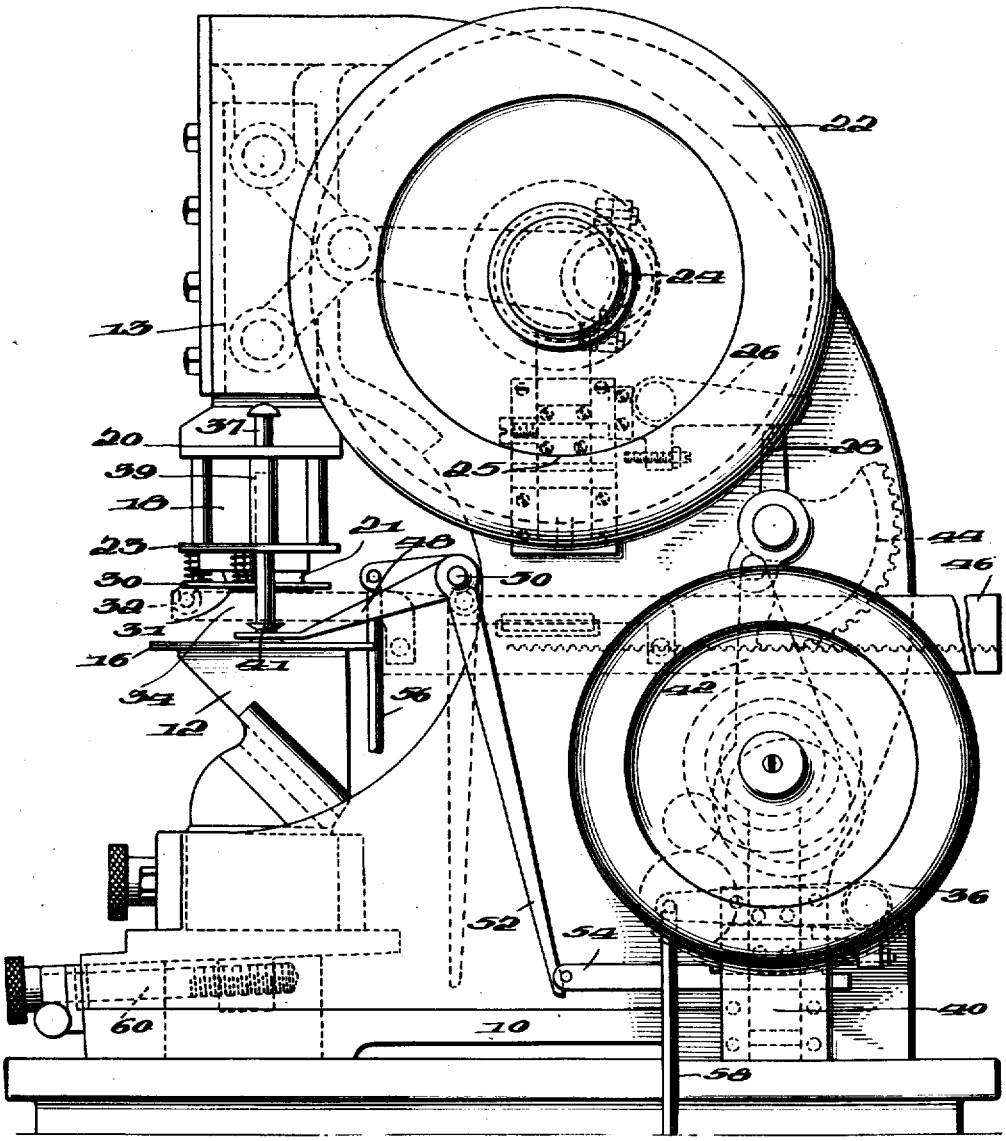
Fig. 2 represents a side elevation.
Figure 3:
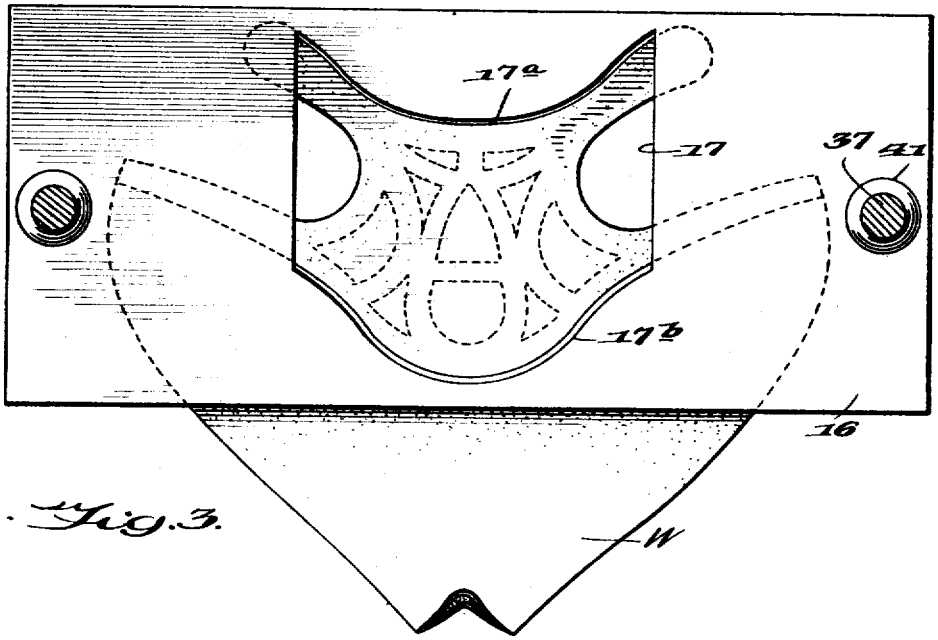
Fig. 3 represents a plan of a gauge plate or mask with a gauge opening of a configuration shown in Patent No. 1,681,033.
Figure 4:
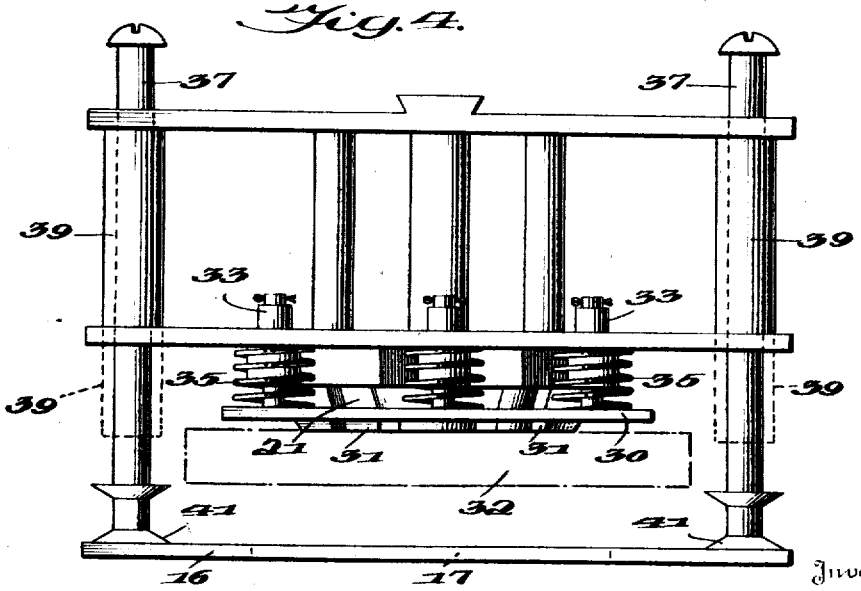
Fig. 4 is an enlarged front elevation of the die parts and gauge of Fig. 1.

I have shown in Figure 3 for purposes of illustration, the form of opening 17 shown in my said former patent, providing internal gauging edges 17*a* and 17*b* by means of which the work W may be gauged by reference to lines of stitching, edges, or laminations, etc. of the work, although as stated external edges of the mask 16 may likewise be used, if the character of the work permits. Obviously, the outline of the opening 17 may be varied to accord with the type of work being treated, and the configuration thereof.

This mask may also function as a clamp or hold down for the work during actual cutting operations thereon.

Mounted to reciprocate relative to the support 12 is a plunger 13 having a die indicated generally at 18 and including a die holder 20. The die will include cutting edges 21 attached to a supporting plate 23. The plunger will be reciprocated periodically from a driving pulley 22 controlled by a single revolution clutch 24, which may be of the type disclosed in Patent No. 1,681,033, above mentioned, and which is operated by a clutch lever 26. This lever 26 is actuated by a mechanism hereinafter described and causes the clutch to connect the driving pulley to the actuating mechanism whereby the pulley will actuate the plunger for a single revolution and cause the die to move down and back during this revolution. In order to impress and mark with ink on the work, a marking element 30 is provided on the die 18 for movement up and down with the die. This element preferably is in the form of a plate having projecting means 31 and may be mounted on the unit 18 by means of studs 33 having springs 35 which tend to normally maintain the plate 30 in advance of the cutting edges 21. A roll 32 for inking this marker is mounted on a carriage 34 and the carriage is geared to move beneath the marker 30 when the latter is raised and for movement to inoperative position when the marker descends. It will be observed that the marking device preferably is extended ahead of the cutting edges of the die, so that the cutting edges of the die are not inked, although the cutting die could be set so that it would be inked, if thought desirable. An advantage of the location of the marking device in advance of the cutting edges of the die resides in the fact that the marking die or plate will exert a stripping action for the cutting or perforating die. This function is possible, because of the fact that the location of the marking plate in advance of the cutting edges perforce places the plate between the work and the cutting edges.

To operate the inking devices, there is provided a pulley 36 controlled by another single revolution clutch 38, like that at 24, and this pulley when connected to the actuating mechanism of the inker is effective to reciprocate the carriage under the marking element and back during a single revolution.

It is obvious that the roll arrangement described above, while forming a preferred embodiment, may be modified, as by manual operation, or various other inking arrangements may be substituted. For example, a flat pad movable into and out of position beneath the marking die might be substituted for the roll, or it may be found desirable to ink the marking device by hand.

The general sequence of operations consists in placing the work on the support 12, accurately positioning same relative to the mask 16, by reference to a gauging edge 17a, 17b, or other gauging medium of the mask, inking the marking element 30 and retracting the inking element. It will be noted that the ink roll 32 operates between the mask 16 which has been brought down for gauging and work-holding purposes, and the ornamenting elements of the die, and is operative at the opposite side of the mask from the work, thus avoiding any tendency towards smearing ink upon the work. Also, since the marking element is advanced with respect to the cutters of the die, tendency toward application of ink to the cutting elements is likewise avoided.

After inking the die, the plunger with the marking element and cutting die thereon is brought down against the work, the plunger immediately being retracted to permit removal of the work. It will be obvious, of course, that the work may be positioned relative to the marking element after such element has been inked, rather than before.

The mask 16 is mounted for movement relative to the die unit 18 by studs 37 which extend through sleeves 39 forming part of the die unit 18, the studs 37 being headed at their upper ends to limit movement of the mask in one direction and being provided with collars 41 for engagement with a lever 48 hereinafter described.

In order that work may be inserted and removed without damage to the operator a lever 48 is provided to raise and lower the mask for the insertion of and subsequent clamping of a shoe part. This lever is pivoted about a shaft 50 and forms one end of a bell crank having a second arm 52, which arm engages a clutch locking bar 54. This bar in turn engages a clutch wedge 40 and thereby prevents actuation by the driving pulley 36 at such time as the mask is raised.

To actuate the levers 48 and 52 a treadle 56 is utilized, same being connected to the shaft 50. Upon actuation of treadle 56 the mask will be lowered and the clutch locking mechanism unlocked.

An additional treadle 58 controlling operation of the machine is connected to actuate the clutch wedge 40, thereby to connect the driving pulley 36 by means of an eccentric strap 42 to a gear segment 44 for engaging a rack 46, which is formed as a part of the carriage 34. The shaft on which this gear segment 44 is mounted also supports an arm carrying a roll 28 which is adapted to engage a lever 26 above described, which lever controls the clutch 24. A spring actuated clutch wedge 25 is controlled by the clutch lever 26 and upon actuation of the lever by the roll 28, the wedge is released and the clutch 24 brought into operation to connect the driving pulley 22, for a single revolution to the plunger actuating mechanism. It will thus be seen that a chain of automatically acting connections is provided from the treadle 58 to the plunger actuating mechanism and including the inker mechanism and that an additional mechanism is provided for controlling movements of the mask which act to lock said chain of connections against operation until the work is properly positioned.

The work support 12 is provided with an adjustable mechanism such as a micrometer adjusting gauge 60 whereby it may be raised and lowered to meet variable conditions, different thicknesses of leather, etc. This support will preferably be interchangeable with other supports of varying heights to take different sizes or style of work. Insofar as the cutout features of the machine are concerned, reference may be made to my aforesaid Patent No. 1,681,033.

It will be observed that the head of the machine is adapted to contain the mechanism for moving the die holder up and down, and that the dies in the illustrated embodiment are mounted on the underside of the holder which is attached to the plunger. It may be desirable under certain conditions to mount the dies in various other arrangements, for example, on the work support or to separate the marking elements from the cutting dies, i. e., from the striping mechanism for the cutitng dies. It has been found feasible to place the marking elements on the mask itself, as distinguished from the stripper or die proper, and it is to be understood that any suitable arrangement of machinery which will satisfactorily carry out the method may be utilized.

In the form of machine described herein the dies are removably mounted on the plunger so that different dies can be replaced or removed. Automatic mechanism may be provided for locating the die in proper position and holding it against the plunger. Owing to the weight of the die this is important as the die should not be loosely held in place in such a position. Preferably the holding mechanism will be of a nature to grip the die and hold same tightly in position. It may be further observed that the mechanism for actuating the plunger has a toggle motion, and as stated above that the clutch controlling this toggle mechanism is locked against operation, except when the gauging means on the die are in such position as to be ready for the cutting out or marking operation. The gauge or mask will usually be attached in such a manner as to form a part of the die, and will be provided with openings, e. g., the openings 17, the edges of which will act as a gauge, or with abutments or solid gauges against which the work rests when properly positioned, and it will be observed that the mask 16 is movable independently of the ornamenting elements of the die, by a separate means, and must be first treadled, down toward the work, before the main clutch is unlocked.

Usually the gauging means will function in advance of both the marking die and cutting die and with sufficient space between the work and the die as to permit the operator a full view of the work.

From the foregoing the operation of the machine will be clear; with the plunger and the gauging mask in raised position the operator will position the work on the support. The mask or gauge will then be lowered to a position sufficiently close to the work to insure accurate gauging therewith.

When the mask or gauge has been lowered to a position where it will clamp the work, the clutch 38 will be unlocked and ready for actuation through the medium of the treadle 58. Upon actuation of such treadle the clutch 38 will provide for actuation of the inking mechanism, and the roll 32 will be projected under the marking element. Should the operator still have her fingers under the die this mechanism will act to clear the space under the die just previous to the time the die descends, and would sweep away the fingers, or any other obstacle that should happen to be there. Therefore, it not only acts as an inking device, but also acts as a safety device. It will function in this manner even though the machine is being used only for perforating and no ink is applied to the roll. In fact the roll may be shaped or the roll carriage may mount a device particularly shaped to perform this function of sweeping away the fingers or any other obstruction from the path of the cutter. While this action is taking place the connections from the clutch 38 to the clutch 24 are being actuated, and as the roll 32 reaches its inoperative position the mechanism connected to the plunger will come into play and the die will descend, operate on the work and return.

When the operator presses the treadle 56, this lowers the gauge plate, releases the machine for operation by the treadle 58, and incidentally clamps the work. When the treadle 58 is actuated, this starts the machine through its cycle of first inking and then striking the die down through the work, and while the marking plate holds down the gauge plate against the work during the actual cutting stroke, the retention of this plate in position by the operator results in its acting, as above set forth, as a hold down for the work while the die is making its return stroke, in which function it is assisted by the spring action of the marking plate.

It will be obvious that the machine will operate to cut without inking, or to mark without cutting, or to both cut and mark the work, and that the cutting and marking may be accomplished simultaneously or successively in any desired order, and automatically. It may be found desirable to accomplish the cutting and marking successively by operating the machine so that the work could either first be cut out and the die moved out of operating position, and then the marking operation be effected, with the idea in mind that the marking and cutting elements be so operated as not to interfere with each other. The work may be held or placed in one position during these successive operations, and it would make no difference whether the work was marked or cut first. This mode of operation is desirable with certain types of dies where the mark is so close to the cutout or perforation that it is impossible to mount the marking plate on the die as indicated and hence a plurality of successive operations will be found more practical. This will be more apparent when it is considered that the shanks of the die are bevelled as the cutting die approaches the cutting edge and during the cutting out operation with a combined marking and cutting die, this portion of the die must pass through the marking element. The marking element has to have a certain amount of support and between these two features it means that marks can only be placed so close to the design.

In cutting out a piece of work, the work has to be gauged or aligned with reference to the die and when marking the work it again has to be gauged, for the cutting and marking operations are separate and distinct from one another. In practice it is very difficult, no matter how accurately the gauge is made to position the work, which is usually of light material, in such a manner that the cutting and marking are exactly aligned and this causes a lot of work to be spoiled. An essential advantage of the present machine resides in the fact that regardless of whether the marking and cutting out are performed simultaneously or as a continuous operation, it is possible to avoid the separate gauging for marking and cutting, thereby insuring always perfect alignment as the work is only positioned once with respect to the gauge.

Having thus described my invention, what I claim as new and desire to secure by Letters Patent of the United States, is:

1. A machine for ornamenting shoe parts comprising a support, means to properly position a piece of work on said support, a marking die and a cutting die, means to apply ink to said marking die, means to retract said ink applying means from operative position, and means automatically actuatable by said inking means to initiate movement of said die toward the work.

2. A machine for ornamenting shoe parts comprising a support, means to properly position a piece of work on said support, a marking die and a cutting die, means to apply ink to said marking die, means to retract said ink applying means from operative position, means automatically actuatable by said inking means to initiate movement of said die toward the work, and means to lock the inking means against movement.

3. A machine for ornamenting shoe parts comprising a support, means to properly position a piece of work on said support, a marking die and a cutting die, means to apply ink to said marking die, means to retract said ink applying means from operative position, means automatically actuatable by said inking means to initiate movement of said die toward the work, and means to lock said die moving means in an inoperative position until actuated by said inking means.

4. A machine for ornamenting shoe parts comprising a support, means to properly position a piece of work on said support, a marking die and a cutting die, means to apply ink to said marking die, means to retract said ink applying means from operative position, means automatically actuatable by said inking means to initiate movement of said die toward the work, means to lock said die moving means in an inoperative position until actuated by said inking means, and means to lock said inking means against movement.

5. A machine for ornamenting shoe parts comprising a support, means to properly position a piece of work on said support, a marking die and a cutting die, means to apply ink to said marking die, means to separate said ink applying means and said marking die, means controlled by said inking means to initiate movement of said dies toward the work, and means to lock the inking means against movement.

6. A machine for ornamenting shoe parts comprising a support, means to properly position a piece of work on said support, a marking die and a cutting die, means to apply ink to said marking die, means to separate said ink applying means and said marking die means controllable by said inking means to initiate movement of said dies toward the work, and means to lock said die moving means in an inoperative position until released by said inking means for actuation.

7. A machine for ornamenting shoe parts, comprising a support, means to properly position a piece of work on said support, a marking die and a cutting die, means to apply ink to said marking die, means to separate said ink applying means and said marking die, means controllable by said inking means to initiate movement of said dies toward the work, means to lock said die moving means in an inoperative position until released by said inking means, and means to lock said inking means against movement.

8. A machine for ornamenting shoe parts comprising a support, means to properly position a piece of work on said support, a marking die and a cutting die, means to apply ink to said marking die, means to initiate movement of said dies toward the work, means to lock said die moving means in an inoperative position, and means to lock said inking means against movement.

9. A machine for ornamenting shoe parts comprising a work support, means to properly position a piece of work on said support, a marking die and a cutting die, means to adjust the position of said support, relative to said dies, means to apply ink to said marking die, means to separate said ink applying means and said marking die, and means automatically actuatable by said inking means to initiate movement of said dies toward the work.

10. A machine for ornamenting shoe parts comprising a support, means to properly position a piece of work on said support, a combined marking and perforating die, means to adjust the position of said support relative to said dies, means to actuate said marking and perforating portions of the dies toward the work, thereby to provide a perforated ornamental pattern in the work, and guide lines for a subsequent stitching operation.

11. A machine for ornamenting shoe parts comprising a support, means to properly position a piece of work on said support, a marking die and a cutting die, means to adjust the position of said support relative to said dies, inking means, means to move said inking means and said marking die relative to each other whereby ink may be applied to said die, means to actuate said marking and perforating portions of the dies toward the work, thereby to provide a perforated ornamental pattern in the work, and guide lines for a subsequent stitching operation.

12. A machine for ornamenting shoe parts, comprising a work suport upon which the work is positioned during operations on the work, a marking die and a cutting die, each mounted in spaced relation to said support, and each of said dies being mounted for separate movement relative to the other into engagement with the work, actuating means to effect an ornamenting engagement between said dies and the work, means forming part of the machine to ink said marking die, said work support being effective to maintain the work in operative position relative to said dies.

13. A machine for ornamenting shoe parts, comprising a marking die and a cutting die, each of said dies being mounted for separate movement relative to each other into engagement with the work, actuating means to move said dies into ornamenting engagement with the work, means to apply ink to said marking die, means to separate said ink applying means and said marking die, and means automatically actuatable by said inking means to initiate movement of the cutting die toward the work, and means for supporting the work in operative position relative to said dies.

14. A machine for ornamenting shoe parts comprising a marking die and a cutting die, each of said dies being mounted for separate movement relative to each other in engagement with the work, actuating means to move said dies into ornamenting engagement with the work, means to apply ink to said marking die, means to separate said ink applying means and said marking die, means controlled by said inking means to initiate movement of said dies toward the work, and means for supporting the work in operative position relative to said dies.

15. A machine for ornamenting shoe parts comprising a marking die and a cutting die, each of said dies being mounted for separate movement relative to each other into engagement with the work, actuating means to move said dies into ornamenting engagement with the work, means to apply ink to said marking die, means to separate said ink applying means and said marking die, means controlled by said inking means to initiate movement of said dies toward the work, means for suporting the work in operative position relative to said dies, and means to lock the inking means against movement.

16. A machine for ornamenting shoe parts comprising a marking die and a cutting die, each of said dies being mounted for separate movement relative to each other into engagement with the work, actuating means to move said dies into ornamenting engagement with the work, means to apply ink to said marking die, means to separate said ink applying means and said marking die, means controlled by said inking means to initiate movement of said dies toward the work, means for supporting the work in operative position relative to said dies, means to lock the inking means against movement, and means to lock the die moving means in an inoperative position, said last named locking means being under control of said inking means.

17. A machine for ornamenting shoe parts comprising a work support upon which the work is positioned during operations on the work, means to properly position a piece of work on said support, a cutting die mounted in spaced relation to said support, and having a marking plate movably mounted thereon, also in spaced relation to said support, means forming part of the machine to apply ink to said marking plate when the plate is in one position relative to the cutting die, means to effect an engagement of said cutting die and said plate with the work whereby the work will receive an ink impression and will be perforated by said cutting die.

18. A machine for ornamenting shoe parts, comprising a work support, a die, pressure applying means, a gauge mask mounted for movement relative to said die, and means in the machine independent of the die, to move said mask relative to the die and work support.

19. A machine for ornamenting shoe parts, comprising a work support, a die, pressure applying means, a gauge mask mounted for movement relative to said die and work support, means in the machine independent of the die, to move said mask, and means to render said pressure applying means inoperative until said mask reaches a predetermined position.

20. An ornamenting machine comprising a work support, a die, pressure applying means, control means therefor, a gauge mask mounted for movement relative to said die, treadle actuated connections to said mask effective to move said mask relative to the die, and means to prevent operation of said control means until said mask reaches a predetermined position.

21. An ornamenting machine comprising a work support, a die, pressure applying means, control means effective to initiate actuation of said pressure applying means, a gauge mask mounted for movement relative to said die, treadle actuated connections to said mask effective to move said mask relative to the die, and connections between said mask actuating connections and said control means, whereby said latter means are controlled by the position of said mask.

22. A machine for ornamenting shoe parts, comprising a work support, a die, a plunger reciprocable in said machine, power means for actuating said plunger, means mounting said die on said plunger for movement toward and from the work support, a gauge mask mounted on said die for movement relative to the die and work support, means independent of said die to move said mask, and means connected to said mask moving means, effective to prevent operation of said power means until said mask reaches a predetermined position.

23. An ornamenting machine comprising a work support, a die, pressure applying means, gauge means to properly position a piece of work on said support, a marking die, means to apply ink to said marking die, means to retract said ink applying means from operative position, means automatically actuatable by said inking means to initiate movement of said die toward the work, and means to lock said die and moving means in an inoperative position until actuated by said inking means.

24. An ornamenting machine comprising a work support, a die, means to apply pressure to said die, movable means to properly position a piece of work on said support, a marking die, means to apply ink to said marking die, means to retract said ink applying means from operative position, means automatically actuatable by said inking, means to initiate movement of said die toward the work, means to lock said die moving means in an inoperative position until actuated by said inking means, and means to lock said inking means against movement until said positioning means reaches a predetermined location relative to the work.

25. An ornamenting machine comprising a work support, a die, means to apply pressure to said die, means to properly position a piece of work on said support, means movable to a position beneath the die to sweep obstructions away from the die, means to retract said movable means from its position beneath the die, means automatically actuatable by said movable means to initiate movement of said die toward the work, means to lock said die moving means in an inoperative position until actuated by said movable means, and means to lock said movable means against movement.

26. A machine for ornamenting shoe parts comprising a work support, a cutting die, a marking die, means to apply ink to said marking die, pressure applying means effective to produce relative movement between the dies and a piece of work on the work support, a gauge mask mounted for movement relative to said die, and means in the machine independent of the die, to move said mask relative to the die and work support.

27. A machine for ornamenting shoe parts comprising a work support, a cutting die, a marking die, means to apply ink to said marking die, pressure applying means effective to produce relative movement between the dies and a piece of work on the work support, a gauge mask mounted for movement relative to said die and work support, means in the machine independent of the die to move said mask, and means to render said pressure applying means inoperative until said mask reaches a predetermined position.

28. A machine for operating upon shoe parts, comprising a work support upon which the work is positioned during operations on the work, means to align a piece of work on said support in proper operating position, a marking die mounted in spaced relation to said support, means to apply ink to said marking die, said ink applying means being movable and operable independently of movement of said die, and means controlled by said ink applying means, to initiate movement of said marking die toward the work.

29. A machine for operating upon shoe parts comprising a work support upon which the work is positioned during operations on the work, means to properly position a piece of work on said support, a head, means for holding a marking die in said head and in spaced relation to said support, means to apply ink to said marking die, and means controlled by said ink applying means, to bring said dies and work into operative engagement thereby to operate upon the work.

30. A machine for operating upon shoe parts comprising a support, means to properly position a piece of work on said support, a head, means for holding marking and perforating dies in said head and in spaced relation to said support, means movable independently of said dies, to apply ink to said marking die, exclusively of said perforating die, and means controlled by said ink applying means to bring said dies and work into operative engagement thereby to operate upon the work.

31. A machine for operating upon shoe parts comprising a support, means to properly position a piece of work on said support, a head, means for holding marking and perforating dies in said head and in spaced relation to said support, said marking die being positioned slightly in advance of said perforating die, means movable independently of said dies, to apply ink to said marking die, exclusively of said perforating die, and means controlled by said ink applying means, to bring said dies and work into operative engagement thereby to operate upon the work.

32. In a machine for ornamenting shoe parts, a work support, a combined marking and cutting die unit comprising a cutter effective to apply an ornamental pattern to a shoe part on said work support, and a marking plate effective to apply guide lines for subsequent operations to such part, in predetermined spaced relation to the cut-out, said marking plate being located in a plane slightly in advance of the cutting edges of said cutting die, means to move said combined unit into operative relation with the shoe part, movable means to apply marking material to the marking plate, and means controlled by movements of the material applying means, to initiate actuation of the unit moving means.

33. An ornamenting machine comprising a work support, means including a combined marking and cutting die unit for applying an ornamental pattern consisting in part of an ink impression and in part of perforations, to a work piece on said support, means to accurately position a piece of work on said support relative to said unit, power driven means to move said unit into ornamenting relation with the work piece, and means to lock said power means against operation until the work piece has been accurately aligned with respect to said unit.

34. The method of ornamenting shoes by cutting an ornamental pattern in a shoe part, and inking guide lines for subsequent operations thereon which comprises supporting the shoe part, aligning said part on the support with a marking die and a cutting die, applying marking material solely to the marking die, restraining both dies against movement into ornamenting relation to the part until the step of applying marking material is completed, and then applying the marking and cutting die under pressure to the part, said cutting die being applied prior to removal of the marking die from the part, and subsequently stitching along the guide lines.

35. The method of ornamenting shoes by simultaneously perforating a shoe part and placing an ink impression thereon as a guide for subsequent operations thereon which comprises supporting the shoe part, aligning said part on the support with a marking die and a cutting die, applying marking material solely to the marking die, restraining both dies against movement into ornamenting relation to the part until the step of applying marking material is completed, and then applying the marking and cutting die under pressure to the part in a single operation, and subsequently stitching along said ink impression.

36. The method of ornamenting shoes by marking a shoe part with an inked guide line for subsequent operations thereon, and perforating said part to provide an ornamental pattern which comprises supporting the shoe part, aligning said part on the support with a marking die and a cutting die, applying marking material solely to the marking die, restraining both dies against movement into ornamenting relation to the part until the step of applying marking material is completed, and then applying the marking and cutting die under pressure to the part, said cutting die being applied prior to removal of the marking die from the part, and subsequently stitching along said guide lines to complete said pattern.

37. The method of ornamenting shoes which consists in inking a marking member, applying said inked marking member to a shoe part to clamp same in position and to produce inked markings thereon, and thereafter cutting out a permanent pattern in the shoe part, the beginning and completion of said cutting out being effected while said inked member is contacting the part.

38. The method of making shoes which consists in inking a marking member, applying said inked marking member to a shoe part, prior to completion of the shoe, to clamp same in position and to produce ink marking thereon, and thereafter cutting out a permanent pattern in the shoe part, the beginning and completion of said cutting out being effected while said inked member is contacting the shoe part, and thereafter completing the shoe by assembling the treated part and other parts in predetermined relation.

39. The method of manufacturing shoes which consists in supporting a shoe part in predetermined spaced relation relative to a cutting die and a marking die, gauging and aligning said part relative to said dies, clamping said work in its gauged and aligned position, cutting a permanent ornamental pattern in the shoe part and applying inked guide lines for subsequent operations thereon by a relative movement between said dies and said part, said cutting out and inking being performed as a continuous cycle of operations while said part is maintained in the aligned position during the cutting and ink marking and thereafter aligning an additional shoe part with respect to said first shoe part by reference to said guide lines, and attaching the parts together.

40. The method of manufacturing shoes which consists in supporting a shoe part in predetermined spaced relation relative to a cutting die and a marking die, gauging and aligning said part relative to said dies, cutting a permanent ornamental pattern in the shoe part and applying inked guide lines for subsequent operations thereon by a relative movement between said dies and said part, said cutting out and inking being performed as a continuous cycle of operations, by movement of said dies relative to each other upon contact thereof with the work, and while said part is maintained in the aligned position during the cutting and ink marking and thereafter aligning an additional shoe part with respect to said first shoe part by reference to said guide lines, and attaching the parts together.

41. The method of ornamenting shoes which comprises supporting a shoe part, aligning said part on the support with a marking die and a cutting die, clamping said part in its aligned position, applying a marking material to said marking die, applying said marking and cutting dies under pressure to the work in a continuous cycle of operations, and thereby producing an ornamental pattern consisting in part of a stamped impression and in part of a cut-out, and applying another shoe part in predetermined relation to said first shoe part by reference to said pattern.

42. The method of ornamenting shoes which consists in supporting a shoe part in predetermined position, gauging and aligning said part on its support relative to a marking die and a cutting die, clamping said part in its gauged and aligned position, cutting a permanent ornamental pattern in the shoe part, and in applying an inked member to said part to produce guide lines for subsequent operations, said cutout and said inking being performed as a single operation by relative movement between said dies and said part while said part is maintained in the aligned position, said cutting out being effected while said marking die is substantially contacting the part and subsequently stitching along the guide lines.

43. The method of ornamenting shoes which consists in supporting a shoe part in predetermined position, gauging and aligning said part on its support relative to a marking die and a cutting die, cutting a permanent ornamental pattern in the shoe part, and in applying an inked member to said part to produce guide lines for subsequent operations, said cut out and said inking being performed as a single operation by relative movement between said dies and said part while said part is maintained in the aligned position, said cutting out being effected while said marking die is contacting and holding the part, and subsequently stitching along the guide lines.

44. The method of ornamenting shoes which consists in supporting a shoe part in predetermined spaced relation to an ornamenting die, gauging and aligning said part relative to said die, and simultaneously perforating the shoe part to provide a permanent ornamental pattern, and in marking said part with an ink impression to provide a guide line for subsequent operations, said cutting out and said inking being performed as a single operation by relative movement between the perforating and marking portions of the die, and between the shoe part and the ornamenting die while said part is maintained in aligned position, and additionally perforating said shoe part subsequent to said first perforating and marking operation by reference to the marked guide line thereby to complete the ornamental pattern.

45. A machine for ornament shoe parts, comprising a work support upon which the work is positioned during operations on the work, means to properly position a piece of work on said support, a resiliently mounted marking die and a cutting die, each mounted in spaced relation to said support, means forming part of the machine to apply ink to said marking die, and means to initiate a relative movement between said cutting and marking dies and the work.

46. A machine for ornamenting shoe parts, comprising a work support upon which the work is positioned during operations on the work, means to properly position a piece of work on said support, a combined marking and cutting die unit having relatively movable cutting and marking elements mounted in spaced relation to said support, means forming part of the machine to apply ink to said unit, means to separate said ink applying means and said unit, and means to initiate a relative movement between said unit, and the work.

47. A machine for ornamenting shoe parts comprising a work support upon which the work is positioned during operations on the work, means to properly position a piece of work on said support, a head, means for holding marking and perforating dies in said head and in spaced relation to said support, means forming part of the machine to apply ink to said marking die exclusive of said cutting die, and means to bring said dies and work into operative engagement thereby to ornament the work.

48. A machine for ornamenting shoe parts comprising a work support, means to properly position a piece of work on said support, a marking die and a cutting die mounted for movement relative to each other, means to apply ink to said marking die, means to retract said ink applying means from operative position, and means to initiate movement of said dies toward the work.

49. A machine for ornamenting shoe parts, comprising a work support upon which the work is positioned during operations on the work, means to properly position a piece of work on said support, a marking die and a cutting die each mounted in spaced relation to said support, means forming part of the machine to apply ink to said marking die, exclusive of said cutting die, means to actuate said marking die and cutting die toward the work thereby to produce a perforated ornamental pattern, and a stamped impression forming a guide for subsequent operations on the work.

50. A machine for ornamenting shoe parts comprising a work support upon which the work is positioned during operations on the work, means to properly position a piece of work on said support, a combined marking and perforating die mounted in spaced relation to said support, means forming part of the machine to apply ink to said marking die, means to actuate said marking and perforating portions of the dies simultaneously toward the work, the marking and perforating portions being relatively spaced and relatively movable whereby first one and then the other will engage the work to produce a perforated ornamental pattern, and a stamped impression forming a guide for subsequent operations on the work.

51. A machine for ornamenting shoe parts comprising a support positioned to receive and retain a piece of work thereon, means to properly position a piece of work on said support, a marking die and a cutting die mounted in spaced relation to said support and movable independently of each other and with respect to said support, means forming part of the machine to apply ink to said marking die, and means to initiate a relative movement between said cutting and marking dies, and the work.

52. The method of ornamenting shoes which comprises supporting a shoe part, aligning said part on the support with a marking die and a cutting die, applying a marking material to said marking die, applying said marking and cutting dies by a relative movement to each other, under pressure to the work, in a continuous cycle of operation and thereby producing an ornamental pattern consisting in part of a stamped impression and in part of a cutout, and applying another shoe part in predetermined relation to said first shoe part by reference to said pattern.

53. The method of ornamenting shoes which comprises supporting a shoe part, aligning said part on the support with a marking die and a cutting die, applying a marking material solely to said marking die, applying said marking die under pressure to the part, applying said cutting die under pressure to the part, thereby to produce respectively inked guide lines for subsequent operations on the part, and a permanent ornamental pattern located in predetermined relation thereto.

54. The method of ornamenting shoes which comprises supporting a shoe part, aligning said part on the support with a marking and cutting die unit, applying a marking material solely to the marking portions of said unit, then applying said unit under pressure to the part, thereby to produce in a single operation a permanent ornamental pattern and inked guide lines for subsequent operation on the part, located in predetermined relation to said pattern.

55. The method of ornamenting shoes which comprises supporting a shoe part, aligning said shoe part on the support with a marking die and a cutting die, applying a marking material to the marking die only and then applying said marking and cutting dies under pressure to the part in a single operation, thereby to produce a permanent ornamental pattern and inked guide lines for subsequent operation on the part located in predetermined relation to said pattern.

56. A combined ink marking and cutting die unit comprising a die support, a die block on said support, cutting edges extending from said support, a marking plate having portions designed to receive ink, and yieldable means mounting said marking plate on said block in advance of said cutting edges, whereby the marking plate may be inked without inking the cutting edges of the die, said mounting means being arranged to apply no substantially greater pressure than required for printing operations.

57. A combined ink marking and cutting die unit comprising a die support, a die block on said support, cutting edges extending from said support, a marking die comprising a plate located approximately parallel to said die block and having portions designed to receive ink, said plate also having an opening through which said cutting edges may extend, and yieldable means mounting said marking plate on said block and normally urging it to position in advance of said cutting edges while permitting movement toward and from said cutting edges whereby the marking plate may be inked without inking the cutting edges of the die, said mounting means being arranged to apply no substantially greater pressure than required for a printing operation.

58. In combination with a cutting die having cutting edges for cutting designs in shoe upper material, a support for the die, a mask cooperating with the die, said mask being provided with one or more edge portions to partially surround the cutting edges of the die, said edge or edge portions shaped to act as a gauge for the positioning of the material beneath the mask, and marking means cooperating with the die having portions designed to receive ink, and positioned to apply ink markings to the material during a single operation in which the work is also cut.

59. In an ornamenting machine for shoe uppers, a support for shoe upper material and a clamping member cooperating therewith constructed and arranged to provide a preliminary positioning relative to the material, permitting adjustment of the material and subsequently a firm holding engagement therewith, and means to ink mark and perforate the material during the holding engagement by said clamping member.

60. A machine for ornamenting shoe parts comprising a work support, upon which the work is positioned during operations on the work, means to properly position a piece of work on said support, a resiliently mounted marking die and a cutting die, each mounted in spaced relation to said support, means forming part of the machine to apply ink to said marking die, and means to initiate a relative movement between said cutting and marking dies and the work, said means for applying ink comprising an inking member mounted for movement from an inoperative position at one side of the marking die to a position for engagement with said marking die.

61. A machine for ornamenting shoe parts comprising a work support, means to properly position a piece of work on said support, a marking die and a cutting die, means to apply ink exclusively to said marking die and to retract said ink applying means from operative position comprising an inking member mounted for movement from an inoperative position at one side of the marking die to a position for engagement with said marking die, and means to initiate movement of the dies toward the work.

62. A machine for ornamenting shoe parts comprising a work support, upon which the work is positioned during operations on the work, means to properly position a piece of work on said support, a resiliently mounted marking die and a cutting die, each mounted in spaced relation to said support, means forming part of the machine to apply ink to said marking die, and means to initiate a relative movement between said cutting and marking dies and the work, said means for applying ink comprising an inking member mounted for movement from an inoperative position at one side of the marking die to a position for engagement with said marking die, said marking die and cutting die being mounted on a single head.

63. A machine for ornamenting shoe parts comprising a work support, upon which the work is positioned during operations on the work, means to properly position a piece of work on said support, a marking die and a cutting die, each mounted in spaced relation to said support, means forming part of the machine to apply ink to said marking die, and means to initiate a relative movement between said cutting and marking dies and the work, said means for applying ink comprising an inking member mounted for movement from an inoperative position at one side of the marking die to a position for engagement with said marking die, said dies being mounted for movement relative to each other and means to maintain the work in its position on said support during said operations.

64. A machine for ornamenting shoe parts comprising a work support, upon which the work is positioned during operations on the work, means to properly position a piece of work on said support, a marking die and a cutting die, each mounted in spaced relation to said support, means forming part of the machine to apply ink to said marking die, and means to initiate a relative movement between said cutting and marking dies and the work, said means for applying ink comprising an inking member mounted for movement from an inoperative position at one side of the marking die to a position for engagement with said marking die, said marking die comprising a marking plate movably mounted on the cutting die.

65. A machine for ornamenting shoe parts comprising a work support, upon which the work is positioned during operations on the work, means to properly position a piece of work on said support, a marking die and a cutting die, each mounted in spaced relation to said support, means forming part of the machine to apply ink solely to said marking die, and means to initiate a relative movement between said cutting and marking dies and the work, said means for applying ink comprising an inking member mounted for movement from an inoperative position at one side of the marking die to a position for engagement with said marking die, said dies being mounted for movement relative to each other and means to maintain the work in its position on said support during said operations, comprising clamping means energized by the pressure incident to the cutting out operation.

66. A machine for ornamenting shoe parts comprising a work support, upon which the work is positioned during operations on the work, means to properly position a piece of work on said support, a marking die and a cutting die, each mounted in spaced relation to said support, means forming part of the machine to apply ink to said marking die, and means to initiate a relative movement between said cutting and marking die and the work, said means for applying ink comprising an inking member mounted for movement from an inoperative position at one side of the marking die to a position for engagement with said marking die, said marking die and cutting die being mounted on a single head, and movable relative to each other to clamp the work in its proper position during the ornamenting operation.

67. A machine for ornamenting shoe parts, comprising a work support upon which the work is positioned during operations on the work, means to properly position a piece of work on said support, a marking die and a cutting die each mounted in spaced relation to said support, means forming part of the machine to apply ink soley to said marking die, means to clamp the work in position during operations thereon, and means to initiate a relative movement between said cutting and marking dies, and the work.

68. A machine for ornamenting shoe parts, comprising a work support upon which the work is positioned during operations on the work, means to properly position a piece of work on said support, a combined marking and cutting die unit mounted in spaced relation to said support, means forming part of the machine to apply ink soley to the marking portions of said unit, means to separate said ink applying means and said unit, means to clamp the work in position during operations thereon, and means to initiate a relative movement between said unit, and the work.

69. A machine for ornamenting shoe parts, comprising a work support, means to properly position a piece of work on said support, a marking die and a cutting die, means to apply ink solely to said marking die, means to retract said ink applying means from operative position, means to clamp the work in position during operations thereon, and means to initiate movement of said dies toward the work.

70. A machine for ornamenting shoe parts, comprising a work support upon which the work is positioned during operations on the work, means to properly position a piece of work on said support, a marking die and a cutting die each mounted in spaced relation to said support, means forming part of the machine to apply ink solely to said marking die, means to clamp the work in position during operations thereon, means to actuate said marking die and cutting die toward the work whereby to produce a perforated ornamental pattern, and a stamped impression forming a guide for subsequent operations on the work.

71. A combined ink marking and cutting die unit for use in a machine for cutting out and imprinting a shoe part, comprising a die support, a die block on said support, cutting edges extending from said support, a marking plate having marking projections thereon and resilient means mounting said marking plate on said block normally in advance of said cutting edges whereby the marking plate may be inked without inking the cutting edges of the die, a second plate mounted in said unit having an aperture through which the cutting and imprinting operation may be effected, said second plate having gauging means for locating the work.

72. A combined ink marking and cutting die unit for use in a machine for cutting out and imprinting a shoe part, which machine is provided with an inking element, comprising a die support, a die block on said support, cutting edges extending from said support, a marking plate having marking projections thereon and resilient means mounting said marking plate on said block normally in advance of said cutting edges whereby the marking plate may be inked without inking the cutting edges of the die, a second plate mounted in said unit having an aperture through which the cutting and imprinting operation may be effected, said second plate having gauging means for locating the work, said plate being positioned to lie between the marking plate and the work during an operation on the work, said plate being mounted for movement to a position spaced away from said marking plate to permit application of said inking element to the latter.

73. In combination, a combined ink marking and cutting die unit for use in a machine for cutting out and imprinting a shoe part, comprising a die support, a die block on said support, cutting edges extending from said support, a marking plate having marking projections thereon and resilient means mounting said marking plate on said block normally in advance of said cutting edges whereby the marking plate may be inked without inking the cutting edges of the die, a gauge plate, means for retaining said gauge plate in a position interposed between the marking plate and the work, said plate having an aperture through which the cutting and imprinting operation may be effected.

74. In combination, a combined ink marking and cutting die unit for use in a machine for cutting out and imprinting a shoe part, which machine is provided with an inking element, comprising a die support, a die block on said support, cutting edges extending from said support, a marking plate having marking projections thereon and resilient means mounting said marking plate on said block normally in advance of said cutting edges whereby the marking plate may be inked without inking the cutting edges of the die, a gauge plate, means for retaining said gauge plate in a position interposed between the marking plate and the work, said plate having an aperture through which the cutting and imprinting operation may be effected, and means whereby said plate is moved to a position spaced away from the marking plate a distance sufficient to permit the application of said inking element to the latter.

75. In combination, a combined ink marking and cutting die unit for use in a machine for cutting out and imprinting a shoe part, comprising a die support, a die block on said support, cutting edges extending from said support, a marking plate having marking projections thereon and resilient means mounting said marking plate on said block normally in advance of said cutting edges whereby the marking plate may be inked without inking the cutting edges of the die, a movable gauge plate, means for retaining said gauge plate in a position interposed between the marking plate and the work, said gauge plate being so constructed and arranged that the cutting and imprinting operations may be effected through the plane of said plate, and said gauge plate having operating means independent of the movement of said marking plate, whereby the plate may be moved and held spaced from the cutting edges of the die unit.

76. A combined ink marking and cutting die unit for use in a machine for cutting out and imprinting a shoe part in a single operation, which machine is provided with an inking element, comprising a die support, a die block on said support, cutting edges extending from said support, a marking plate having marking projections, and resilient means mounting said projections on said block normally in advance of said cutting edges, whereby the marking projections may be inked without inking the cutting edges of the die, a second plate so constructed and arranged that the cutting and imprinting operations may be effected past the plane of said plate, and said second plate being mounted to lie between the work and the marking plate during an operation on the work, means mounting said second plate for relative movement from said marking plate a distance effective to permit application of said ink applying member to said marking plate, and toward said marking plate during the operation on the work, and gauging means on said second plate, for locating the work in proper alignment relative to said cutting edges and marking projections.

77. In an ornamenting machine for cutting out and imprinting a shoe part at a single operation, a combined ink marking and cutting die unit comprising a die support, a die block on said support, cutting edges, extending from said support, a marking plate having marking projections, and resilient means mounting said projections on second block normally in advance of said cutting edges, whereby the marking projections may be inked without inking the cutting edges of the die, a second plate so constructed and arranged that the cutting and imprinting operations may be effected past the plane of said plate, and said second plate being mounted to lie between the work and the marking plate during an operation on the work, means to apply ink to the marking projections, means to produce a relative movement between the work and the die unit, gauging means on said plate for locating the work, and means to move and hold said second plate spaced from the cutting edges of the unit.

78. In an ornamenting machine for cutting out and imprinting a shoe part at a single operation, a combined ink marking and cutting die unit comprising a die support, a die block on said support, cutting edges extending from said support, a marking plate having marking projections, and resilient means mounting said projections on said block normally in advance of said cutting edges, whereby the marking projections may be inked without inking the cutting edges of the die, a second plate so constructed and arranged that the cutting and imprinting operations may be effected through the plane of said plate, and said second plate being mounted to lie between the work and the marking plate during an operation on the work, means mounted for insertion between said marking projections and said second plate, at the opposite side of said second plate from the work, to apply ink to the marking projections, means to produce a relative movement between the work and the die unit, gauging means on said plate for locating the work, and means to move and hold said second plate spaced from the cutting edges of the unit.

79. A combined ink marking and cutting die unit for use with a cutting and marking operation, wherein means is provided for applying pressure to the work, exclusive of the cutter and marker, comprising a die support, a die block on said support, cutting edges extending from said support, a stripping and marking plate for said cutting means, work marking elements mounted on said plate, and means mounting said stripping and marking plate on said block, effective to apply sufficient pressure to said plate to mark the work and to position said plate normally in advance of said cutting edges, whereby the stripping and marking plate may be inked without inking the cutting edges of the die, and to exert a stripping pressure against the work, and work engaging means independent of said pressure applying means to apply pressure to the work, in the direction of stripping pressure.

80. A combined ink marking and cutting die unit for use with a cutting and marking operation, wherein means is provided for applying pressure to the work exclusive of the cutter and marker, comprising a die support, a die block on said support, cutting edges extending from said support, a combined stripping and marking plate for said cutting means, work marking elements mounted on said plate, and means mounting said stripping and marking plate on said block, effective to apply sufficient pressure to said plate to mark the work and to position said plate normally in advance of said cutting edges, whereby the stripping and marking plate may be inked without inking the cutting edges of the die, and to exert a stripping pressure against the work, and combined work gauging and clamping means independent of said pressure applying means to apply pressure to the work in the direction of stripping pressure.

81. In an ornamenting machine for cutting out and imprinting a shoe part at a single operation, a combined ink marking and cutting die unit comprising a die support, a die block on said support, cutting edges extending from said support, a marking plate, and spring means mounting said marking plate on said block, over said cutting edges, and in advance of said cutting edges, whereby the marking plate may be inked without inking the cutting edges of the die, said plate being positioned so that relative movement between the parts of the die unit will press a supported work piece against the said parts to first depress the marking plate and then cut the work piece, the spring means for mounting the marking plate being proportioned to apply a proper marking pressure to the work engaged thereby, a work gauging plate mounted independently of the cutter and marker, and movable to apply a pressure to the work in the direction of, and additional to the pressures applied to the marking plate.

82. In an ornamenting machine, the combination with ornamenting means including a marking plate having at least one marking die thereon, of means acting on the marking plate and independently thereof, respectively, for exerting a stripping pressure on the work.

83. In an ornamenting machine, the combination with ornamenting means including a marking plate, having at least one marking die thereon, of spring means acting on the marking plate, and means acting independently thereof, respectively, for exerting a stripping pressure on the work.

84. In an ornamenting machine, the combination with ornamenting means including a marking plate having at least one marking die thereon, of means, including a spring, acting on the marking plate and independently thereof, respectively, for exerting a stripping pressure on the work.

85. In an ornamenting machine for cutting out and imprinting a shoe part in a single operation, a pressure applying plunger, a work supporting anvil below and co-operative with said plunger, a cutting die and a marking die operatively interposed between said plunger and anvil, the top surface of said anvil forming a cutting block for the work, a gauge mask cooperative with said anvil for aligning a work piece thereon with respect to said die, said mask being movably mounted such that it can be raised and lowered for placing work on and removing same from the anvil, an ink applying member mounted to apply ink to said marking die upon a relative movement laterally between said die and said member, said marking die having marking elements resiliently mounted and normally spaced slightly in advance of the cutting edges of the cutting die, whereby ink may be applied exclusively to said marking elements, and means to actuate said plunger and press said dies down into engagement with the work, when the work is aligned beneath the die.

86. In a machine for ornamenting shoe parts, a combined ink marking and cutting die for cutting out and imprinting a shoe part, comprising a die support, a die block on said support, cutting edges extending from said support, a marking member having marking projections thereon and resilient means mounting said marking member on said block normally in advance of said cutting edges, whereby the marking projections may be inked without inking the cutting edges of the die, a work engaging plate mounted in said machine having an edge portion, past the plane of which the cutting and imprinting operation may be effected, said edge portion providing gauging means conforming to a predetermined characteristic of the work, for locating the work relative to the die, said plate being mounted to extend between the marking member and the work during an operation on the work, and for movement to a position spaced from the marking member to permit application of a marking medium to said member, and means to apply a marking medium to said member.

87. In a machine for ornamenting shoe parts, a die support, a combined ink marking and cutting die for cutting out and imprinting a shoe part in a single operation, comprising a die block on said support, cutting edges extending from said support, a marking plate having marking projections thereon, and resilient means mounting said marking plate on said block normally in advance of said cutting edges whereby the marking projections may be inked without inking the cutting edges of the die, a gauge plate, means mounting said gauge plate to extend in a position interposed between the marking plate and the shoe part, said plate having an edge portion, past the plane of which the cutting and imprinting operation may be effected, said edge portion being shaped to clear the die during an ornamenting operation on the work, said plate being mounted for movement to a position spaced away from the marking plate a distance sufficient to permit the application of an inking element to the latter.

88. In a machine for ornamenting shoe parts, a pressure applying plunger, a combined ink marking and cutting die operably co-operative with said plunger for cutting out and imprinting a shoe part, comprising a die support, a die block on said support, cutting edges extending from said support, a marking member having marking projections thereon and resilient means mounting said marking member on said block normally in advance of said cutting edges, whereby the marking projections may be inked without inking the cutting edges of the die, a work support forming a cutting block for the work, a work engaging plate mounted in said machine having an edge portion, past the plane of which the cutting and imprinting operation may be effected, said edge portion providing gauging means conforming to a predetermined characteristic of the work, for locating the work on the cutting block relative to the die, said plate being mounted to extend between the die and work and in engagement with the work, during an operation thereon, and for movement to a position spaced from the cutting block to permit application and removal of the work and application of a marking medium to said member, and means to apply a marking medium to said member.

89. In a machine for ornamenting shoe parts, a vertically reciprocable die support, a combined ink marking and cutting die thereon for cutting out and imprinting a shoe part in a single operation, comprising a die block on said support, cutting edges extending from said support, a marking plate having marking projections thereon, and resilient means mounting said marking plate on said block normally in advance of said cutting edges whereby the marking projections may be inked without inking the cutting edges of the die, a work support forming a cutting block for the work, a gauge plate for aligning the shoe part on the cutting block, relative to the die, means mounting said gauge plate to extend in a position interposed between the die and the shoe part and in engagement with the part, during normal operation, said plate having an edge portion, past the plane of which the cutting and imprinting operation may be effected, said edge portion being shaped to clear the die during an ornamenting operation on the work, said plate being mounted for movement to a position spaced away from the cutting block a distance sufficient to permit the application and removal of the work and application of an inking element to the latter.

BENJAMIN W. FREEMAN.

CERTIFICATE OF CORRECTION.

Reissue No. 21,321. January 16, 1940.

BENJAMIN W. FREEMAN.

It is hereby certified that error appears in the printed specification of the above numbered patent requiring correction as follows: Page 5, second column, line 5, claim 12, for "suport" read support; page 6, first column, line 73, claim 24, after the word "inking" strike out the comma; page 7, second column, line 12, claim 38, for the word "making" read marking; and that the said Letters Patent should be read with this correction therein that the same may conform to the record of the case in the Patent Office.

Signed and sealed this 12th day of March, A. D. 1940.

Henry Van Arsdale,
Acting Commissioner of Patents.

(Seal)